United States Patent
Shain (10) Patent No.: US 10,826,235 B2
(45) Date of Patent: Nov. 3, 2020

(54) LATCH MECHANISM FOR MOBILE SYSTEMS AND RELATED METHODS

(71) Applicant: FLIR Security, Inc., Ridgefield Park, NJ (US)

(72) Inventor: Chaim Shain, Parkland, FL (US)

(73) Assignee: FLIR COMMERCIAL SYSTEMS, INC., Goleta, CA (US)

( * ) Notice: Subject to any disclaimer, the term of this patent is extended or adjusted under 35 U.S.C. 154(b) by 0 days.

(21) Appl. No.: 16/359,711

(22) Filed: Mar. 20, 2019

(65) Prior Publication Data

US 2019/0312385 A1    Oct. 10, 2019

Related U.S. Application Data

(60) Provisional application No. 62/655,154, filed on Apr. 9, 2018.

(51) Int. Cl.
*H01R 13/627* (2006.01)
*H01R 43/26* (2006.01)
*H04N 5/232* (2006.01)
*H01R 13/52* (2006.01)

(52) U.S. Cl.
CPC ......... *H01R 13/6275* (2013.01); *H01R 43/26* (2013.01); *H01R 13/5219* (2013.01); *H04N 5/23203* (2013.01)

(58) Field of Classification Search
CPC ............ H01R 13/6275; H01R 13/4361; H01R 13/639
USPC ................ 439/271, 345, 346, 347, 352, 350
See application file for complete search history.

(56) References Cited

U.S. PATENT DOCUMENTS

| | | | | |
|---|---|---|---|---|
| 5,865,640 A | * | 2/1999 | Tadokoro | G06F 1/1616 439/347 |
| 6,193,539 B1 | * | 2/2001 | Chang | H01R 13/6278 439/346 |
| 6,790,070 B1 | * | 9/2004 | England, II | H01R 13/6397 439/305 |
| 7,033,218 B2 | * | 4/2006 | Huang | H01R 13/6275 439/353 |
| 7,297,014 B1 | * | 11/2007 | Stowers | H01R 13/621 439/372 |

(Continued)

OTHER PUBLICATIONS

"AXON FLEX 2", Product Brochure, Mar. 5, 2018, Retrieved from the Internet:<URL:https://global.axon.com/products/flex-2>, on Jun. 6, 2019.

(Continued)

*Primary Examiner* — Peter G Leigh
(74) *Attorney, Agent, or Firm* — Haynes and Boone, LLP (57) ABSTRACT

Various techniques are provided to secure a connector to a module, for example, for convenient and reliable use in mobile environments. In one example, a system includes a housing and a latch mechanism. The latch mechanism includes first and second opposing latch members that define a cavity configured to receive a cable connector. The latch mechanism also includes first and second bias members configured to maintain the latch members in tension with each other. The latch members are configured to slide relative to each other in response to the bias members to secure the connector relative to the housing. Additional systems and methods are also provided.

20 Claims, 8 Drawing Sheets

(56) References Cited

U.S. PATENT DOCUMENTS

| | | | | |
|---|---|---|---|---|
| 7,588,447 B1* | 9/2009 | Ni | ................... | H01R 13/4534 |
| | | | | 439/137 |
| 7,782,608 B2* | 8/2010 | Lee | ................... | G06F 1/1632 |
| | | | | 361/679.41 |
| 8,469,732 B2* | 6/2013 | Sen | ................... | H01R 13/639 |
| | | | | 439/347 |
| 8,951,060 B2* | 2/2015 | Meyer-Ebeling | .... | H01R 13/639 |
| | | | | 439/347 |
| 9,300,086 B1* | 3/2016 | Qu | ................... | H01R 13/6392 |
| 9,484,681 B2* | 11/2016 | Little | ................ | H01R 13/6597 |
| 9,515,439 B2* | 12/2016 | Ng | .................. | H01R 24/70 |
| 9,660,400 B2* | 5/2017 | Cheng | ................. | H01R 24/60 |
| 9,787,032 B1* | 10/2017 | Talalayev | ............... | H01R 24/60 |
| 2018/0241154 A1* | 8/2018 | Khorrami | ............ | H01R 13/639 |

OTHER PUBLICATIONS

"DEMS" 360, Product Brochure, Mar. 5, 2018, Retrieved from the Internet: <URL:https://www.revealmedia.com/int/products/rs2-x2-body-camera> on Jun. 6, 2019.

"RS2-X2 Case Studies", Product Brochure, Mar. 5, 2018, Retrieved from the Internet: <URL: https://www.revealmedia.com/int/case-studies/city-protection-group-gothenburg-sweden> on Jun. 6, 2019.

"Law Enforcement Solutions", Product Brochure, Mar. 5, 2018, Retrieved from the Internet: URL<http://www.safetyvision.com/law-enforcement> on Jun. 6, 2019.

* cited by examiner

LATCH MECHANISM FOR MOBILE SYSTEMS AND RELATED METHODS

CROSS-REFERENCE TO RELATED APPLICATIONS

This application claims the benefit of and priority to U.S. Provisional Patent Application No. 62/655,154 filed Apr. 9, 2018 and entitled "LATCH MECHANISM FOR MOBILE SYSTEMS AND RELATED METHODS," which is incorporated herein by reference in its entirety.

This application is related to U.S. Provisional patent application Design No. 29/642,973 filed Apr. 3, 2018 and U.S. Provisional patent application Design No. 29/642,979 filed Apr. 3, 2018, all of which are incorporated herein by reference in their entirety.

TECHNICAL FIELD

The present invention relates generally to physical communication connections and, more particularly, to the securing of cables for mobile systems.

BACKGROUND

Advancements in electronics and related technologies have led to the increasing miniaturization of electronic devices. This reduction in form factor has facilitated the creation of many types of mobile devices that may be used in a variety of outdoor or uncontrolled environments.

In some cases, it may be desirable for individual mobile devices to communicate with each other. For example, such communication is conventionally performed by one or more wireless communication standards such as Bluetooth®). Unfortunately, wireless communication can be subject to interference, limited bandwidth, and/or signal interception.

To combat these problems, mobile devices may sometimes be connected together by wired connections. However, conventional wired connections typically rely on a friction fit or similar engagement of a cable with a device. As a result, such connections are susceptible to inadvertent disconnection in the course of ordinary use.

Such disconnection can be particularly problematic in the fields of law enforcement, security, and mobile surveillance, where a user's hands may be occupied with various tasks and may not be available to re-check or re-secure existing wired connections. In such cases, both conventional wireless and wired connections may be largely impractical.

SUMMARY

Improved techniques for physically securing wired cable connections are provided. In some embodiments, a latch mechanism is provided that may receive and engage with a cable connector in a secure manner to prevent inadvertent withdrawal of the cable connector from a device without intentional user action to do so.

In one embodiment, a system includes a housing; and a latch mechanism comprising: first and second opposing latch members that define a cavity configured to receive a cable connector, first and second bias members configured to maintain the latch members in tension with each other, and wherein the latch members are configured to slide relative to each other in response to the bias members to secure the connector relative to the housing.

In another embodiment, a method includes inserting a cable connector into a cavity defined by first and second latch members of a latch mechanism; sliding the latch members apart in response to pressure applied by the connector against upper engagement surfaces of the first and second latch members while the connector is inserted into the cavity; and sliding the latch members toward each other in response to bias members to secure lower engagement surfaces of first and second latch members against the connector to impede withdrawal of the connector from the cavity.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
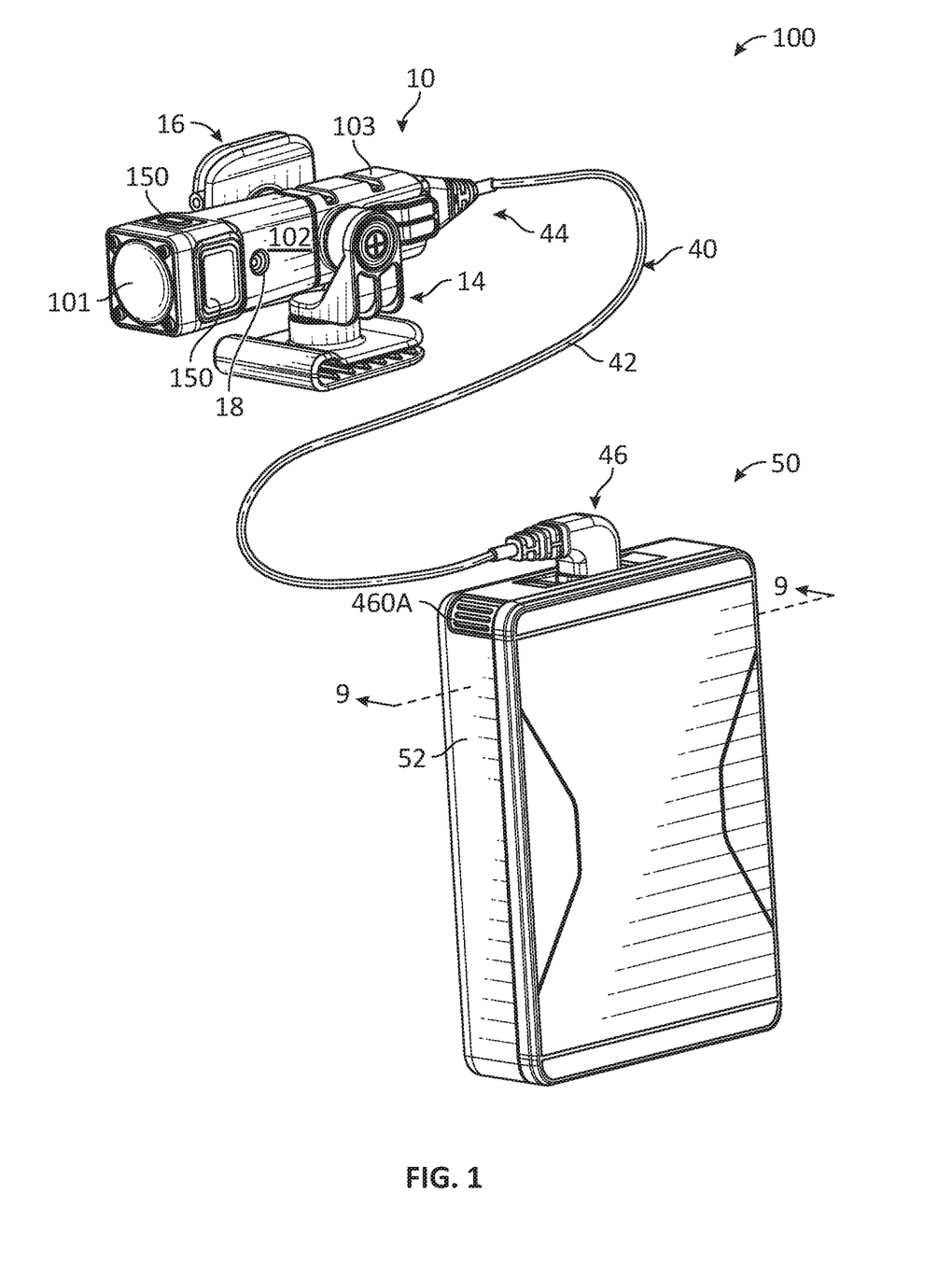
FIGS. 1-2 illustrate perspective views of a modular system including a sensor module and a storage module in accordance with embodiments of the disclosure.
Figure 2:
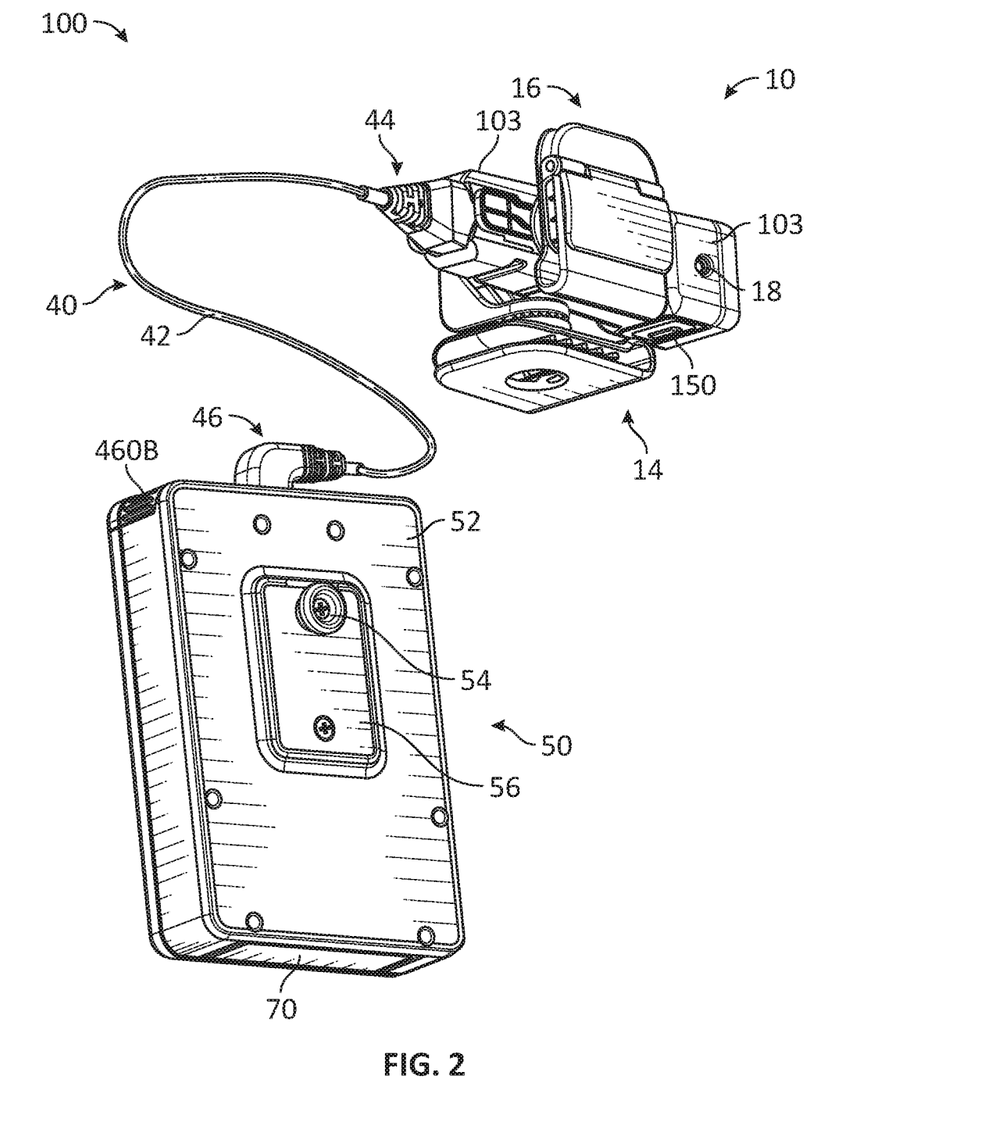

FIGS. 1 and 2 illustrate perspective views of a modular system 100 including a sensor module 10 and a storage module 50 connected together by a cable 40 in accordance with embodiments of the disclosure. Sensor module 10 (also referred to as a sensor assembly unit or a data acquisition portable device) performs data capture and data transfer to storage module 50, for example, over cable 40. As shown, sensor module 10 includes various types of sensors including, for example, a camera 101, microphones 18, and/or other sensors as further discussed herein.

Sensor module 10 includes a housing 102 configured to be held by a sleeve 103 engaged with one or more mounts 14 and 16. As a result, sensor module 10 may be conveniently secured to a variety of locations for positioning as desired. For example, in some embodiments, mounts 14 and 16 may be configured to attach to a user's clothing, hat, eyeglasses, sunglasses, and/or other accessories in order to position sensor module 10 for capturing images of the user's environment. As a result, sensor module 10 may be conveniently used, for example, by law enforcement and/or security personnel in mobile environments. Sensor module 10 further includes one or more controls 150 (e.g., user controls) such as various buttons as shown which may be used to adjust the operation of sensor module 10 and/or the attached storage module 50.

Storage module 50 (also referred to as a power communication storage module or a power and storage module) stores data received from sensor module over cable 40 and, in some embodiments, provides electrical power to sensor module 10 through cable 40. As shown, storage module 50 includes a housing 52 which may be implemented, for example, as a ruggedized housing suitable for outdoor environments.

Storage module 50 further includes a mount 54 which may be secured to an appropriate base to secure storage module 50 in a desired location. For example, in some embodiments, mount 54 may engage with a base maintained on a user's person, such as on a user's belt or pants. Storage module 50 also includes a cover 56 that may be selectively opened to reveal a removable memory, such as a flash memory card. Storage module 50 further includes a display 74 which may be used to provide various information to a user.

Cable 40 includes a cable body 42 joined with connectors 44 and 46 respectively engaged with sensor module 10 and storage module 50. With regard to storage module 50 in particular, connector 46 may be secured relative to the housing 52 of storage module through the engagement of a latch mechanism as further discussed herein. In some embodiments, connector 44 may be secured to sensor module 10 in the same or similar manner.

In various embodiments, cable 40 may include one or more signal transfer mediums (e.g., electrical conductors, optical fibers, and/or others) enclosed by an outer shell and/or additional layers of insulation, shielding, and/or other layers. For example, in some embodiments, cable 40 may be implemented as a USB-C cable with USB-C connectors 44 and 46, however other types of electrical and/or optical cables and associated connectors are also contemplated. The signal transfer mediums of cable 40 are connected to corresponding electrical, optical, and/or other contacts provided by connectors 44 and 46 for passing signals between sensor module 10 and storage module 50.

As discussed, sensor module 10 and storage module 50 may be conveniently secured to a user while in use. Thus, by connecting sensor module 10 and storage module 50 with cable 40, a user may operate the modular system 100 in a distributed manner with sensor module 10 and storage module 50 positioned at various different advantageous and convenient locations on the user's person.

Figure 3:
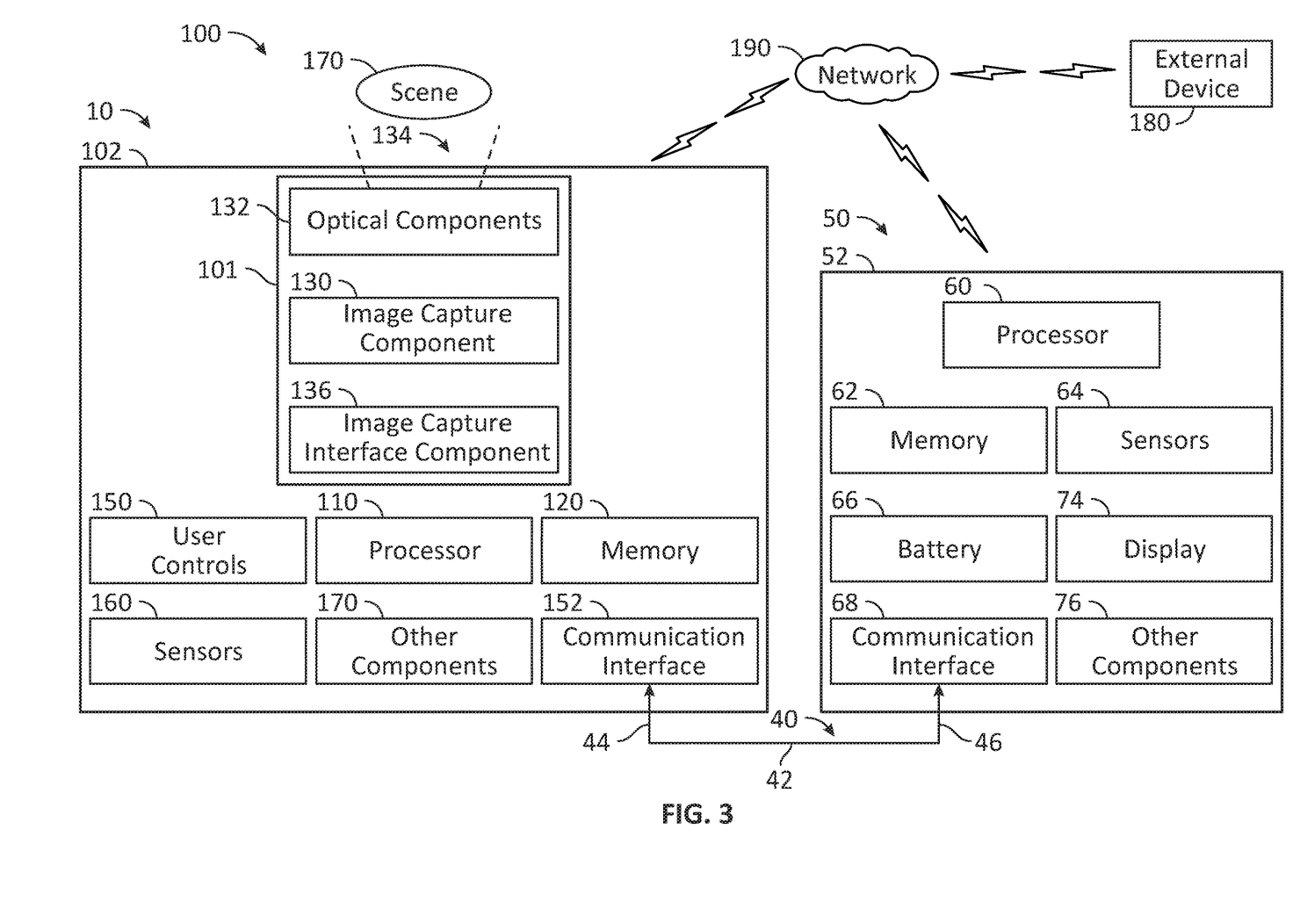
FIG. 3 illustrates a block diagram of a modular system including a sensor module and a storage module in accordance with an embodiment of the disclosure.

FIG. 3 illustrates a block diagram of modular system 100 in accordance with an embodiment of the disclosure. In this regard, some of the features discussed with regard to FIGS. 1 and 2 are illustrated in FIG. 3 in block diagram form along with additional features as further discussed herein. Sensor module 10 may include a camera 101, a housing 102, a processor 110, a memory 120, user controls 150, a communication interface 152, sensors 160, and other components 170.

Camera 101 may be used to capture and process images (e.g., image frames) of a scene 170 (e.g., a field of view). In various embodiments, camera component 101 may be implemented as a visible image camera, an infrared camera (e.g., thermal camera), and/or other types of cameras as appropriate. As shown, camera 101 may include an image capture component 130, optical components 132, and an image capture interface component 136. Optical components 132 (e.g., one or more lenses) receive visible light and/or infrared radiation through an aperture 134 and pass the light/radiation to image capture component 130. Image capture component 130 may include an array of sensors (e.g., any type visible light, infrared, or other types of detectors) for capturing images of scene 170. The sensors of image capture component 130 provide for representing (e.g., converting) a captured images of scene 170 as digital data (e.g., via an analog-to-digital converter). Image capture interface component 136 provides the data to processor 110 which may be used to process the images, store the original and/or processed images in memory 120, and/or retrieve stored images from memory 120.

Processor 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combinations of processing device and/or memory to execute instructions to perform any of the various operations described herein. Processor 110 is configured to interface and communicate with the various components illustrated in FIG. 1 to perform method and processing steps as described herein. In various embodiments, processing operations and/or instructions may be integrated in software and/or hardware as part of processor 110, or code (e.g., software or configuration data) which may be stored in memory 120. In some embodiments, memory 120 may include a machine-readable memory configured to store such processing operations and/or instructions in a non-transitory manner for execution by processor 110.

Memory 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

User controls 150 may include any desired type of user input and/or interface device having one or more user actuated components, such as one or more buttons (e.g., as shown in FIGS. 1 and 2), slide bars, rotatable knobs, and/or other types of controls that are configured to generate one or more user actuated input control signals. Processor 110 may be configured to sense control input signals from user controls 150 and respond to sensed control input signals received therefrom.

Imaging system 100 may include various types of sensors 160 including, for example, microphones (e.g., microphones 18 shown in FIGS. 1 and 2), gyroscopes, accelerometers, vibration sensors, navigation sensors (e.g., global positioning system (GPS) sensors), and/or other sensors as appropriate.

Processor 100 may be configured to receive and pass image data from camera component 101, additional data from sensors 160, and control signal information from user controls 150 to storage module 50 and/or a server 160 through communication interface 152 (e.g., through wired and/or wireless communications). In this regard, communication interface 152 may be implemented to provide wired communication over cable 42 and/or wireless communication over an antenna. For example, communication interface 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 152 may include an antenna coupled thereto for wireless communication purposes. In other embodiments, the communication interface 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, modular system 100 and/or its individual associated components may be associated with a particular network link such as for example a URL (Uniform Resource Locator), an IP (Internet Protocol) address, and/or a mobile phone number.

Sensor module 10 may include various other components 170 such as speakers, displays, visual indicators (e.g., recording indicators), vibration actuators, a battery or other power supply (e.g., rechargeable or otherwise), and/or additional components as appropriate for particular implementations.

Storage module 50 may include a housing 52, processor 60, memory 62, sensors 64, battery 66, storage communication interface 68, display 74, and other components 76. Processor 60 and/or memory 62 may be implemented, for example, in the same or similar manner as any of the embodiments contemplated for processor 110 and/or memory 120 of sensor module 10. In some embodiments, memory 62 may include a removable memory, such as a flash memory card or other form of non-volatile storage to permit data stored by storage module 50 to be conveniently transferred to other devices as desired. Sensors 64 may be implemented, for example, in the same or similar manner as any of the embodiments contemplated for sensors 160 of sensor module 10.

Battery 66 may be used to provide electrical power to the various components of storage module 50 and/or sensor module 10. For example, in some embodiments, battery 66 may provide electrical power to sensor module 10 remotely through cable 40. In various embodiments, any desired type of battery or power supply may be used (e.g., rechargeable or otherwise).

Communication interface 68 may be implemented, for example, in the same or similar manner as any of the embodiments discussed for communication interface 152 of sensor module 10. Display 74 may be implemented, for example as any desired type of user-viewable display to provide appropriate information to the user of storage module 50. Other components 76 may be implemented, for example, in the same or similar manner as any of the embodiments discussed for other components 170 of sensor module 10.

As shown and as previously discussed, sensor module 10 is connected to storage module 50 by cable 40 including cable body 42 and connectors 44 and 46 interfaced with communication interfaces 152 and 68.

In some embodiments, communication interfaces 152 and 68 may be used to connect sensor module 10 and/or storage module 50 to other devices. For example, sensor module 10 and/or storage module 50 may communicate to one or more external devices 180 through one or more networks 190 and/or directly. For example, in some embodiments, such connections may be wireless (e.g., as shown in FIG. 3) or wired.

In some embodiments, sensor module 10 and/or storage module 50 may be configured to determine and/or detect the presence of external devices 180 nearby (e.g., in the same environment corresponding to a defined area and detected through various techniques such as direct communication, networked communication, GPS, geographic information system (GIS), and/or other techniques). In various embodiments, external devices 180 may include, for example, other sensor modules, storage modules, fixed cameras, fixed sensors, and/or other devices. For example, sensor module 10 and/or storage module 50 may communicate with such external devices 180 to permit various users to maintain situational awareness of each other, coordinate the communication and/or storage of various data (e.g., image data, sensor data, location data, metadata, and/or other data), and/or control the operation of sensor module 10, storage module 50, and/or external devices 180 (e.g., directing a nearby camera to pan, tilt, zoom, and/or otherwise orient toward a scene and record). In some embodiments, sensor module 10 and/or storage module 50 may trigger data capture and/or storage to be performed by external devices 180 and vice versa, for example, in response to detected conditions (e.g., sensor values, alarms, user commands, and/or other conditions).

In some embodiments, sensor module 10 and/or storage module 50 may be configured to selectively capture and/or store particular data that may be dependent on a particular mission, operational location, user, and/or other conditions corresponding to a profile. In this regard, in some embodiments, processor 110 of sensor module 10 may be configured to selectively activate, receive data from, and/or pass data associated with particular sensors 160 and/or camera 101. For example, for certain profiles, processor 110 may only permit audio data provided from microphones 18 to be captured and/or passed to module 50 for storage. Similarly, in some embodiments, processor 60 of storage module 50 may be configured to selectively store only certain types of sensor data and/or image data (e.g., in memory 62) under certain conditions.

Any desired features of sensor module 10 and/or storage module 50 may be adjusted based on the selected profile, the particular sensor module 10, and/or the particular storage module 50. Such features may include, for example, image resolution, frame rate, recording method (e.g., constant, manually-triggered, event-triggered, pre-event recording buffer duration, post-event recording buffer duration, video only, audio only, video with audio, and/or others), user privileges (e.g., enabled communication channels), Bluetooth® pairing options, alert criteria (e.g., events detected by various sensors 64/160 and/or camera 101 such as gunshots, speeding objects or persons, immobile objects or persons, and/or other events), operation of recording indicators, and/or other features.

Figure 4:
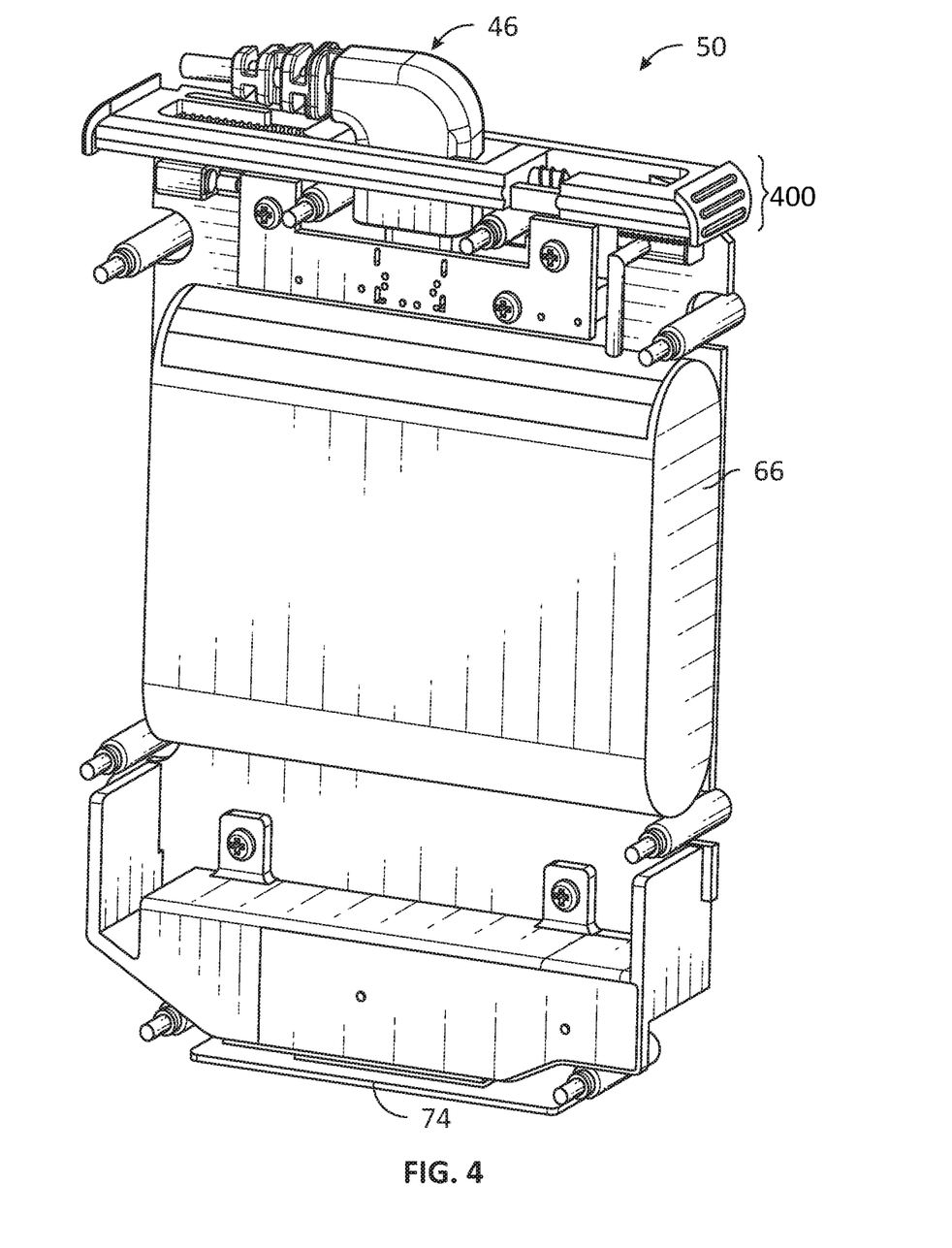
FIG. 4 illustrates a storage module with a connector secured by a latch mechanism in accordance with an embodiment of the disclosure.

FIG. 4 illustrates storage module 50 with connector 46 secured by a latch mechanism 400 in accordance with an embodiment of the disclosure. In FIG. 4, housing 52 has been removed for convenience of illustration to further reveal latch mechanism 400 and the insertion of connector 46 therein. Further features of latch mechanism 400 are discussed below in relation to FIGS. 5-11.

Figure 5:
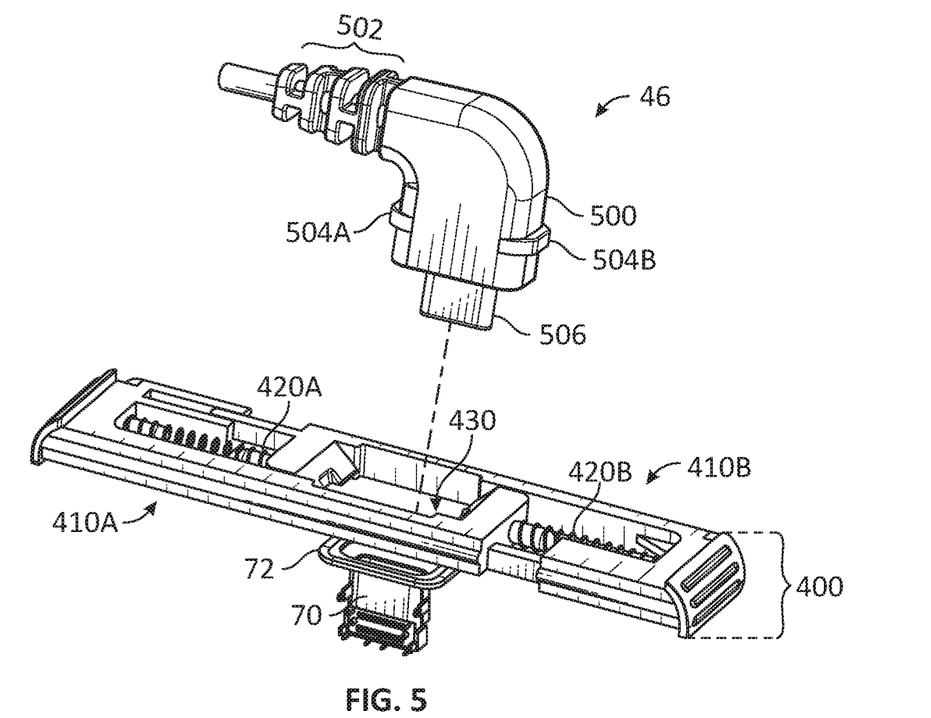
FIG. 5 illustrates a connector and a latch mechanism prior to insertion of the connector into the latch mechanism in accordance with an embodiment of the disclosure.
Figure 6:
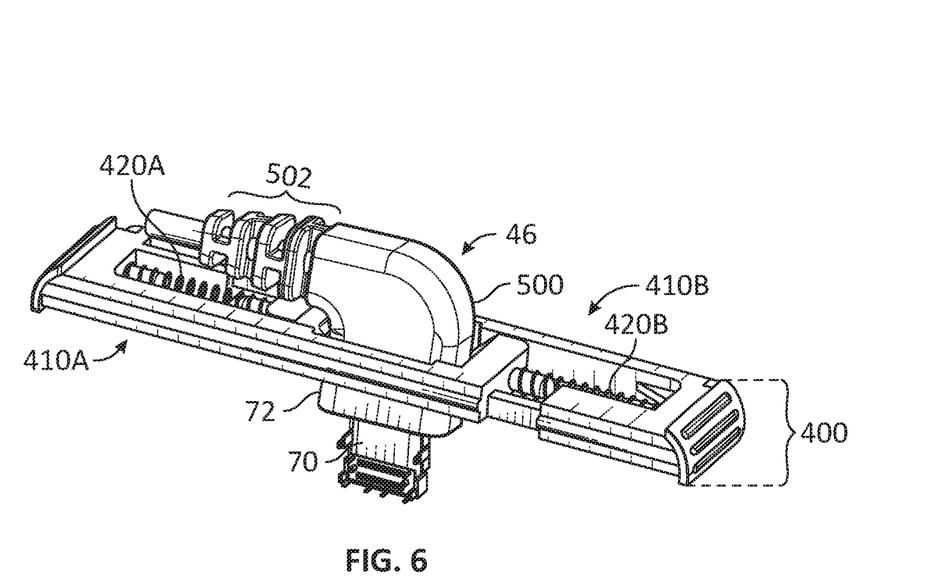
FIG. 6 illustrates a connector and a latch mechanism after insertion of the connector into the latch mechanism in accordance with an embodiment of the disclosure.
Figure 7:
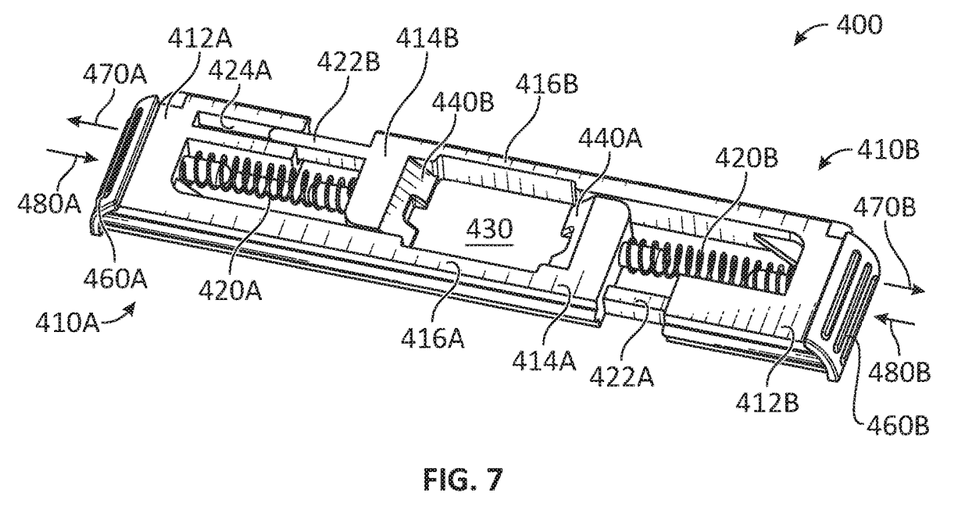
FIGS. 7-8 illustrate perspective views of a latch mechanism in accordance with embodiments of the disclosure.
Figure 8:
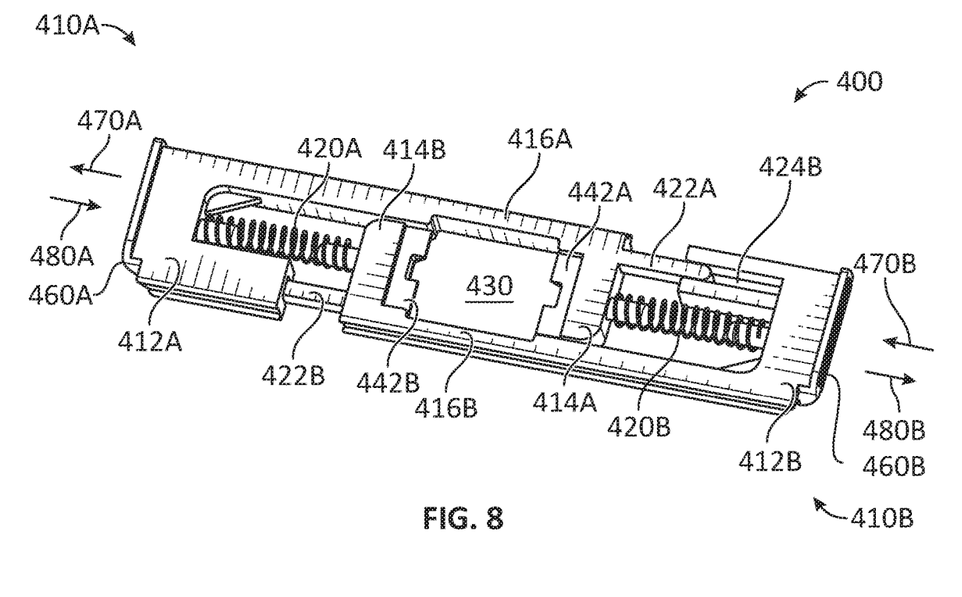

FIG. 5 illustrates connector 46 prior to insertion into the latch mechanism 400 and FIG. 6 illustrates connector 46 after insertion into the latch mechanism 400 in accordance with embodiments of the disclosure. FIGS. 7 and 8 illustrate upper and lower perspective views of latch mechanism 400 in accordance with embodiments of the disclosure.

As shown in FIG. 5, connector 46 includes an outer shell 500 including a strain relief portion 502 and external ridges 504A-B. Connector 46 further includes a port 506 that includes one or more contacts (e.g., a male USB-C port including electrical contacts in the illustrated embodiment). Port 506 is configured to engage with a complementary port 70 of storage module 50 (e.g., connected to communication interface 68 that includes one or more contacts (e.g., a female USB-C port including electrical contacts in the illustrated embodiment).

As shown in FIG. 5, storage module 50 further includes a seal 72 (e.g., a gasket, o-ring, and/or other type of seal). As further shown in FIG. 6, while connector 46 is secured by latch mechanism 400, shell 500 bears against seal 72 and engages therewith to maintain watertight electrical connections between the contacts of ports 506 and 70. Such engagement can be further maintained through the securing of connector 46 by lower engagement surfaces 442A-B of latch mechanism 400 against ridges 504A-B of connector 46 as further discussed herein.

As further shown in FIGS. 5-8, latch mechanism 400 includes opposing latch members 410A-B and bias springs 420A-B. Latch member 410A includes ends 412A and 414A joined by an elongate link 416A. Similarly, latch member 410B includes ends 412B and 414B joined by an elongate link 416B. Latch members 410A-B are configured to slide relative to each other in the directions of arrows 470A-B and 480A-B while remaining interlinked with each other, for example, by tongues 422A-B and grooves 424A-B as shown.

Latch mechanism 400 further includes bias springs 420A-B positioned between latch members 410A-B. In this regard, bias spring 420A is positioned between end 412A of latch member 410A and end 414B of latch member 410B. Similarly, bias spring 420B is positioned between end 412B of latch member 410B and end 414A of latch member 410A. Thus, bias springs 420A-B operate to maintain latch members 410A-B in tension with each other. Specifically, bias springs 410A-B operate to push latch members 410A-B in the directions of arrows 470A-B and resist movement in the directions of arrows 480A-B. Although bias springs 420A-B are shown, any desired type of bias member may be used, such as a bendable flexure, elastic materials, and/or others.

Ends 414A-B and links 416A-B define a cavity 430 configured to receive connector 46. Cavity 430 can be selectively increased (e.g., lengthened) as latch members 410A-B are slid relative to each other in the directions of arrows 480A-B, or decreased (e.g., shortened) as latch members 410A-B are slid relative to each other in the directions of arrows 470A-B.

Ends 414A-B include upper engagement surfaces 440A-B which may be implemented, for example, as inclined ramps as shown. Upper engagement surfaces 440A-B are configured to receive ridges 504A-B as connector 46 is inserted into cavity 430.

Ends 414A-B further include lower engagement surfaces 442A-B which may be implemented, for example, as substantially planar surfaces as shown. Lower engagement surfaces 442A-B are configured to secure ridges 504A-B to prevent withdrawal of connector 46 from cavity 430 after connector 46 has been fully inserted.

Ends 412A-B include actuation surfaces 460A-B which may be used to disengage connector 46 from latch mechanism 400. Actuation surfaces 460A-B may be implemented, for example, as textured surfaces suitable for a user to engage. As shown in FIGS. 1 and 2, actuation surfaces 460A-B may be exposed through housing 52. For example, a user may apply pressure to actuation surfaces 460A-B (e.g., using a thumb and finger for single-handed use or using separate thumbs or fingers for two-handed use) while storage module 50 is attached to the user's person to permit connector 46 to be conveniently withdrawn from cavity 430.

Figure 9:
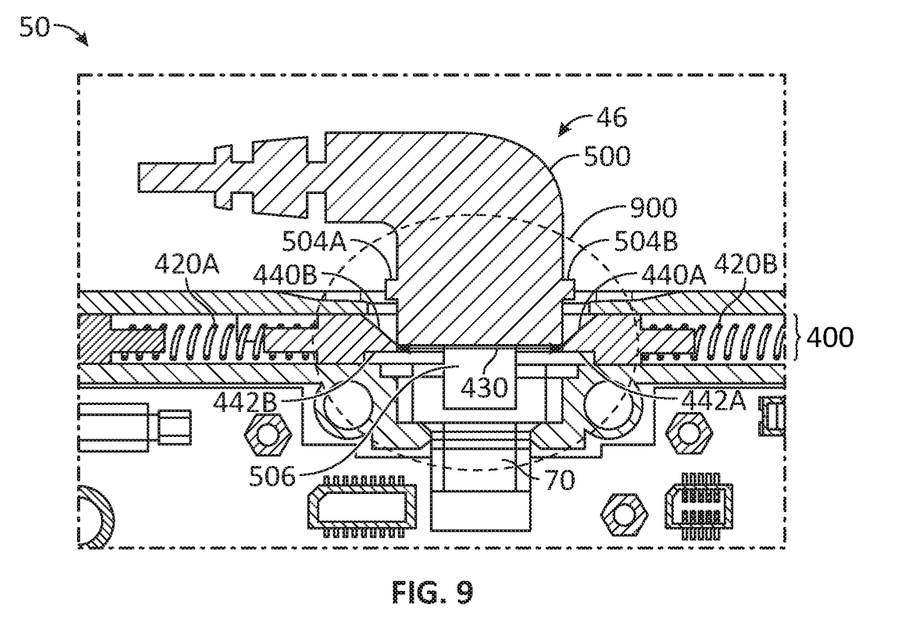
FIGS. 9-11 illustrate cross-sectional views of a storage module and a connector taken at lines 9-9 of FIG. 1 at various stages during a process to secure the connector by a latch mechanism in accordance with embodiments of the disclosure.
Figure 10:
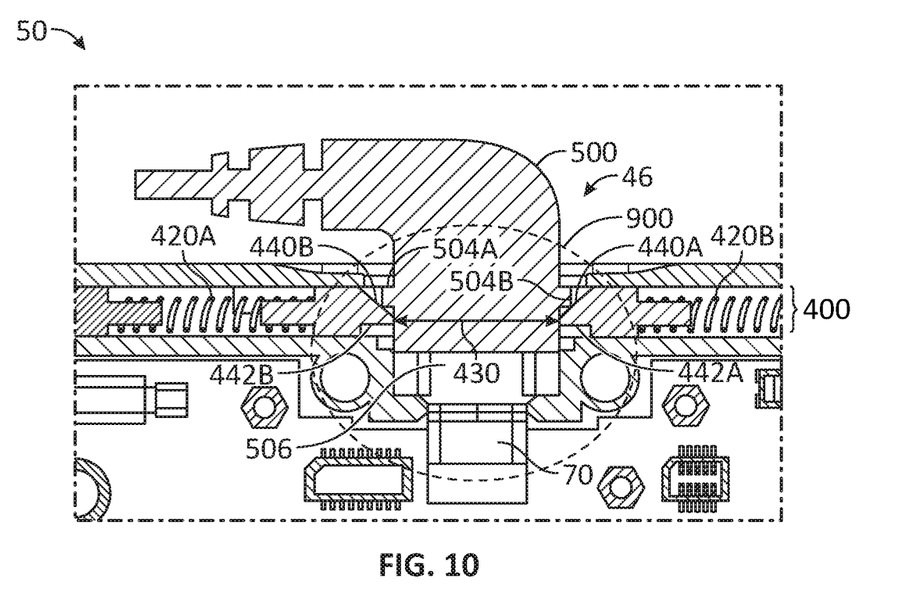
Figure 11:
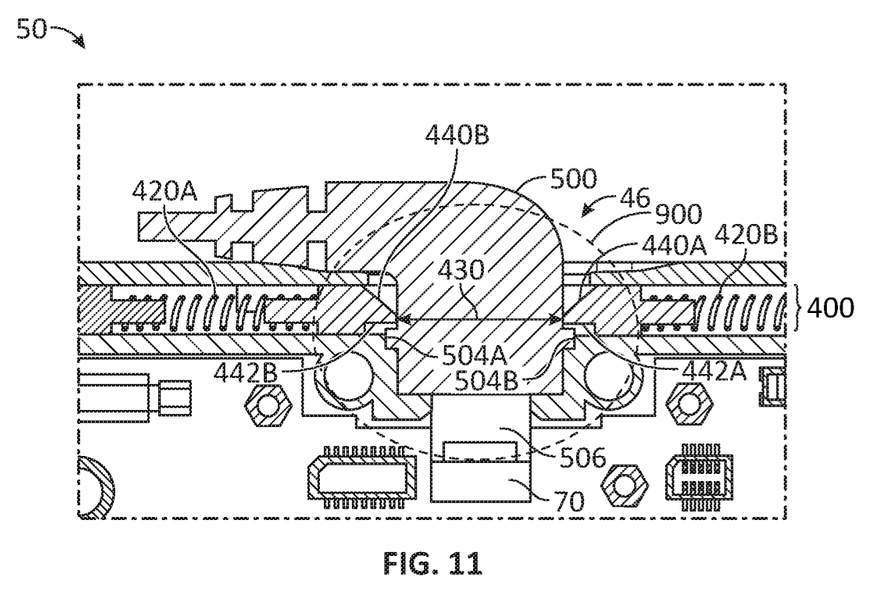

The operation of latch mechanism 400 and related features can be further understood with reference to FIGS. 5-11. In particular, FIGS. 9-11 illustrate cross-sectional views of storage module 50 taken at lines 9-9 of FIG. 1 at various stages during a process to secure connector 46 by latch mechanism 400 in accordance with embodiments of the disclosure. Areas of particular interest in FIGS. 9-11 are identified by a circle 900.

In FIG. 9, connector 46 is initially inserted into cavity 430 such that a bottom portion of shell 500 contacts upper engagement surfaces 440A-B of ends 414A-B. Cavity 430 defined by ends 414A-B may exhibit a width less than that of shell 500 such that further lowering of connector 46 into cavity 430 will cause upper engagement surfaces 440A-B to slide apart and remain in tension against connector 46.

In FIG. 10, connector 46 is further inserted into cavity 430 such that ridges 504A-B of shell 500 are in contact with upper engagement surfaces 440A-B and port 506 is at least partially received by port 70. As connector 46 continues to be additionally inserted into cavity 430, ridges 504A-B will exert downward force on upper engagement surfaces 440A-B. This force will cause latch members 410A-B to slide away from each other in the directions of arrows 470A-B, thus lengthening cavity 430 to permit ridges 504A-B to pass therethrough. Bias springs 420A-B operate to resist the sliding of latch members 410A-B and thus cause ends 414A-B to remain in tension against connector 46 while cavity 430 is lengthened.

In FIG. 11, after ridges 504A-B have finished sliding down the inclined ramps provided by upper engagement surfaces 440A-B, connector 46 will eventually complete its downward movement when ports 506 and 70 are fully engaged with each other. As also shown, ridges 504A-B will now be disposed below the lower engagement surfaces 442A-B at the ends 414A-B of latch members 410A-B. The previously-discussed tension provided by bias springs 420A-B will cause latch members 410A-B to slide in the directions of arrows 470A-B after ridges 504A-B have passed below lower engagement surfaces 442A-B. As a result, lower engagement surfaces 442A-B will be maintained above ridges 504A-B while ends 414A-B continue to bear against shell 500 through the tension provided by bias springs 420A-B.

Thus, connector 46 will remain secured to storage module 50 (e.g., secured relative to housing 52 and latch mechanism 400) through the continued positioning of lower engagement surfaces 442A-B above ridges 504A-B. In this regard, if connector 46 is pulled (e.g., through direct manipulation and/or pulling on cable 40), ridges 504A-B and lower engagement surfaces 442A-B will bear against each other, thus impeding withdrawal of connector 46 from cavity 430.

To release latch mechanism 400, a user may apply pressure to actuation surfaces 460A-B as discussed. Such pressure will cause latch members 410A-B to slide in the directions of arrows 480A-B. As a result, ends 414A-B will slide apart thereby causing lower engagement surfaces 442A-B to also slide apart such that they no longer impede ridges 504A-B and cavity 430 is lengthened. A user may then pull connector 46 out of cavity 430 to disengage ports 506 and 70 from each other and withdraw connector 46 from latch mechanism 400. After connector 46 is withdrawn, the user may release actuation surfaces 460A-B to cause latch members 410A-B to slide back in the directions of arrows 470A-B to a rest position as illustrated in FIG. 9.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   a housing; and
   a latch mechanism comprising:
     first and second opposing latch members that define a cavity configured to receive a cable connector, wherein each latch member comprises first and second ends joined by an elongate link, and the cavity is defined by the elongate links and the second ends of the latch members,
     first and second bias members configured to maintain the latch members in tension with each other, and wherein the latch members are configured to slide relative to each other in response to the bias members to secure the connector relative to the housing.

2. The system of claim 1, wherein the latch members are configured to slide apart in response to pressure applied by the connector against upper engagement surfaces of the latch members while the connector is inserted into the cavity.

3. The system of claim 2, wherein the latch members are configured to slide toward each other in response to the bias members to secure lower engagement surfaces of the latch members with the connector to impede withdrawal of the connector from the cavity.

4. The system of claim 3, further comprising:
   a first port comprising a first plurality of electrical contacts configured to receive a second port of the connector comprising a second set of electrical contacts; and
   a seal configured to engage with the connector to maintain watertight electrical connections between the first and second electrical contacts while the connector is secured by the lower engagement surfaces.

5. The system of claim 3, wherein the upper engagement surfaces comprise inclined ramps and the lower engagement surfaces comprise substantially planar surfaces.

6. The system of claim 1, wherein the latch members are configured to slide apart in response to pressure applied by a user against actuation surfaces of the latch members to permit the connector to be withdrawn from the cavity.

7. The system of claim 1, wherein each bias member comprises a spring engaged with the first and second latch members.

8. The system of claim 1, further comprising a module, wherein:
   the module comprises the housing, the latch mechanism, and a memory; and
   the module is configured to receive data from a sensor unit over a wired connection comprising the cable connector and store the data in the memory.

9. The system of claim 8, further comprising the sensor unit.

10. The system of claim 1, wherein the cable connector is a USB-C cable connector.

11. A method of operating the system of claim 1, the method comprising:
    operating the latch mechanism to secure the connector relative to the housing.

12. The system of claim 1, wherein each bias member is disposed between the first end of a respective one of the latch members and the second end the other latch member, to push the first end of the respective latch member and the second end of the other latch member away from each other while the connector is inserted into the cavity.

13. A method comprising:
    inserting a cable connector into a cavity defined by first and second latch members of a latch mechanism, wherein each latch member comprises first and second ends joined by an elongate link, and the cavity is defined by the elongate links and the second ends of the latch members;
    sliding the latch members apart in response to pressure applied by the connector against upper engagement surfaces of the first and second latch members while the connector is inserted into the cavity; and
    sliding the latch members toward each other in response to bias members to secure lower engagement surfaces of first and second latch members against the connector to impede withdrawal of the connector from the cavity.

14. The method of claim 13, further comprising:
    receiving, at a first port comprising a first plurality of electrical contacts, a second port comprising a second set of electrical contacts during the inserting; and contacting the connector against a seal to maintain watertight electrical connections between the first and second electrical contacts while the connector is secured by the lower engagement surfaces.

15. The method of claim 13, wherein the upper engagement surfaces comprise inclined ramps and the lower engagement surfaces comprise substantially planar surfaces.

16. The method of claim 13, further comprising:
receiving pressure applied by a user against actuation surfaces of the latch members to slide the latch members apart; and
withdrawing the connector from the cavity during the receiving.

17. The method of claim 13, wherein each bias member comprises a spring engaged with the first and second latch members.

18. The method of claim 13, further comprising:
receiving data from a sensor unit over a wired connection comprising the connector while the connector is secured by the latch mechanism; and
storing the data in a memory of a module comprising the latch mechanism.

19. The method of claim 13, wherein the cable connector is a USB-C cable connector.

20. A system comprising:
a housing; and
a latch mechanism comprising:
first and second opposing latch members that define a cavity configured to receive a cable connector, wherein each latch member comprises first and second ends joined by an elongate link, the second end of each latch member is disposed between the first and second ends of the other latch member, and the cavity is disposed between the second ends of the latch members,
first and second bias members, wherein each bias member is disposed between the first end of a respective one of the latch members and the second end of the other latch member, to push the first end of the respective latch member and the second end of the other latch member away from each other when the connector is inserted into the cavity,
wherein the second end of each latch member is configured to slide towards the first end of the other latch member in opposition to the bias members in response to pressure applied by the connector against upper engagement surfaces of the latch members while the connector is inserted into the cavity.

* * * * *

UNITED STATES PATENT AND TRADEMARK OFFICE
CERTIFICATE OF CORRECTION

PATENT NO. : 10,826,235 B2  
APPLICATION NO. : 16/359711  
DATED : November 3, 2020  
INVENTOR(S) : Chaim Shain Page 1 of 1

It is certified that error appears in the above-identified patent and that said Letters Patent is hereby corrected as shown below:

In the Specification

Column 1, Lines 12-13, change "U.S. Provisional patent application Design No." to --U.S. Design Patent Application No.--

Column 1, Line 14, change "U.S. Provisional patent application Design No." to --U.S. Design Patent Application No.--

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*